US005731699A

United States Patent [19]

O'Byrne

[11] Patent Number: 5,731,699
[45] Date of Patent: Mar. 24, 1998

[54] APPARATUS AND METHOD FOR SIMULTANEOUS MEASURING OF NARROW AND WIDEBAND RF TRANSMISSION STATISTICS

[75] Inventor: Vincent A. O'Byrne, Brighton, Mass.

[73] Assignee: GTE Laboratories Incorporated, Waltham, Mass.

[21] Appl. No.: 599,896

[22] Filed: Feb. 12, 1996

[51] Int. Cl.$^6$ .................. G01R 23/00; H04B 17/00
[52] U.S. Cl. .................. 324/77.11; 324/76.19; 324/76.26; 455/67.1
[58] Field of Search .............. 324/76.19, 76.22, 324/76.26, 77.11; 455/67.1, 67.3, 67.5

[56] References Cited

U.S. PATENT DOCUMENTS

| | | | |
|---|---|---|---|
| 3,601,696 | 8/1971 | Chovan | 324/76.19 |
| 4,303,979 | 12/1981 | Kato et al. | 364/485 |
| 4,501,020 | 2/1985 | Wakeman | 455/67.1 |
| 4,628,255 | 12/1986 | Dunnican | 324/76.26 |
| 5,537,680 | 7/1996 | Bruno | 455/67.1 |

Primary Examiner—Glenn W. Brown
Attorney, Agent, or Firm—Leonard C. Suchyta

[57] ABSTRACT

Apparatus and method for measuring the radio signal (RF) transmission statistics of a communication channel. The apparatus is arranged to receive and process a wide bandwidth signal from which signal power is measured and from which fading or other such transmission problems can be measured for the wide bandwidth. In parallel with the wide bandwidth receiver there is a narrow bandwidth receiver arranged to receive the same RF signal but to process only a single tone or narrow bandwidth portion of the RF signal. From this narrow bandwidth processing the narrow bandwidth transmission statistical characteristics of the RF transmission channel can be measured simultaneously with the wide bandwidth statistical characteristics. The outputs of the spectrum analyzer are digitized and fed to a computer for storage and for other analysis.

12 Claims, 3 Drawing Sheets

5,731,699

APPARATUS AND METHOD FOR SIMULTANEOUS MEASURING OF NARROW AND WIDEBAND RF TRANSMISSION STATISTICS

FIELD OF THE INVENTION

The present invention relates generally to simultaneous measurement of wide and narrow bandwidth signal transmission characteristics of an RF (radio frequency) communication channel. In particular, the present invention relates to developing a statistical model of such transmissions to any particular location.

BACKGROUND OF THE INVENTION

When evaluating any particular location for reception of RF transmissions it is important to know both the narrow bandwidth and the wide bandwidth fading statistics of the received RF signal transmission. Use is made of the narrow bandwidth measurements for generating lognormal shadowing while wide bandwidths measurements are used for determining and measuring delays due to the multiple paths taken by the transmitted signal in reaching the receiving antenna. The term lognormal (or log-normal) is a conventional term used in the wireless communications field and denotes a normal distribution of a variable which is measured in logarithmic terms.

There are several problems and limitations when such measurements are made. Different equipment is needed for each measurement and it is time consuming to set up and calibrate two separate sets of equipment. Also, taking such measurements on two different days or at widely different times or time of the day or night or with differing weather conditions may lead to complications and unreliable data. Such measurements may not complement each other, and may lead to poor technical decisions.

It is therefore an object of the present invention to provide an apparatus and a method for simultaneously measuring the statistical nature of narrow and wide bandwidth RF signal transmission characteristics at any given location.

It is a further object of this invention to measure these transmission characteristics simultaneously or closely spaced in time in order to factor out the weather and other local phenomena which may affect such transmissions.

It is yet another object of the present invention to provide an analysis of the statistical nature of radio signal transmissions to any location.

SUMMARY OF THE INVENTION

The foregoing objects are met by the method and apparatus of this invention for simultaneously measuring the wide bandwidth and the narrow bandwidth radio signal transmission statistical characteristics of a communication channel to a location. More specifically, the apparatus of the present invention includes an RF antenna constructed and arranged for receiving RF signals; a first receiver for selectively receiving and processing the wide bandwidth frequencies from the RF signals and producing therefrom a first output, where the first output is related to the wide bandwidth radio signal transmission characteristics; a second receiver for selectively receiving and processing the narrow bandwidth frequencies from the RF signals and producing therefrom a second output, where the second output is related to the narrow bandwidth radio signal transmission characteristics; and means for connecting the RF signals from the antenna to the first and second receivers. In this invention the RF signal is received in parallel and substantially simultaneously by the wide bandwidth and the narrow bandwidth receivers.

The output signals from the receivers are digitized, loaded into a computer where a program operates to analyze both the wide and narrow bandwidth transmission statistics at a location. The spacing between the RF receiving antenna and a transmitting antenna which outputs the signals may be moved over several meters and the measurements repeated so that locales with a rapidly changing reception characteristic can be evaluated. Also, the receiving antenna and receivers may be mounted in a car or other moving vehicle where such information on changing reception is important to wireless communications.

The measurements are reported in statistical terms over time and distance around the immediate environment. The parameters of the reported measurements are, for example:

a) Narrow bandwidth: The variation in the signal level in the vicinity of the receiver is recorded and measured. The data is digitized and fed to a computer for analysis. The data is organized and presented to show the average signal level (that is the signal power level) variation with distance from the transmitter. The deviation of the actual signal level from the average can be generated for any specific location and a distribution indicating standard deviations formulated. From these data the lognormal shadowing of any particular location and the environment are generated. This information is important for designing cellular and other wireless transmitting systems.

b) Wide bandwidth: The measurements are performed as in the narrow bandwidth signals. The entire bandwidth is received and processed as for the narrow bandwidth. However, other characteristics and parameters are often generated. For example, actual delays between the reflected signal and the multipaths taken by the transmitted signal creates an rms (root mean square calculation of power in an AC signal) delay spread. That is the signal power has a delay parameter. In addition, there may be Doppler shifts that are caused by the receiver moving relative to the transmitter.

Both narrow and wide bandwidth measurements are needed since the phenomena which affects a single tone or frequency, usually well under one megahertz, does not necessarily affect the wide bandwidth signal. Narrow bandwidth measurements are usually obtained by transmitting a given tone, or substantially single RF frequency. The tone is received and the signal power measured over time. The effect of phenomena that cause the signal power to fade or otherwise change can be measured and recorded. Wide bandwidth measurements are usually obtained by transmitting a radio frequency carrier modulated to produce a received signal frequency spread over several megahertz around the carrier frequency.

A specific use of the wide bandwidth measurements is to measure the delay from the multiple paths and reflections that the radio frequency signals take in finally reaching the antenna. This may be accomplished by a "slip correlation" scheme where the transmitted modulating signal is recreated at the receiver with a slight time offset. Other techniques are known in the art for accomplishing this measurement of the delay. The recreated signal is then time shifted or slipped with respect to the received signal and the correlation spikes are indicators of the delay in the various paths that the received signal has taken in reaching the receiving antenna. The technique essentially performs a convolution integration of the sent signal and the adulterated received signal.

This technique cannot practically be accomplished transmitting a single tone since reflections and other interfering items will not respond uniformly over the frequency range.

Such radio signal transmission characteristics are measured at a given location, and repeated within a few meters of that location. Therefore it becomes possible to determine whether the location exhibits a rapidly changing reception area which may be unsuitable for a receiving station or the like.

Simultaneous measurements are advantageous since there is duplication of labor in setting up equipment and making separate measurements for a wide bandwidth signal and then for a narrow bandwidth signal. Also, since there are separate licenses needed for wide bandwidth and narrow bandwidth broadcasting, a simultaneous measurement (while only transmitting a wide bandwidth RF signal) would obviously require only the wide bandwidth license.

In a preferred embodiment the band width setting of the narrow bandwidth receiver in the form of, for example, a spectrum analyzer is theoretically zero hertz, but, in practice, the bandwidth setting under one megahertz down to about 300 hertz is used. This range of 1 KHz to 300 hertz is used to account for Doppler effects, transmitter frequency drifts, and noise which becomes great at narrower frequency ranges. The span of the spectrum analyzer is set to zero or near zero and the spectrum analyzer output is a dc signal that represents the signal power for that tone.

Other objects, features and advantages will be apparent from the following detailed description of preferred embodiments thereof taken in conjunction with the accompanying drawings.

DETAILED DESCRIPTION OF PREFERRED EMBODIMENTS

Figure 1:
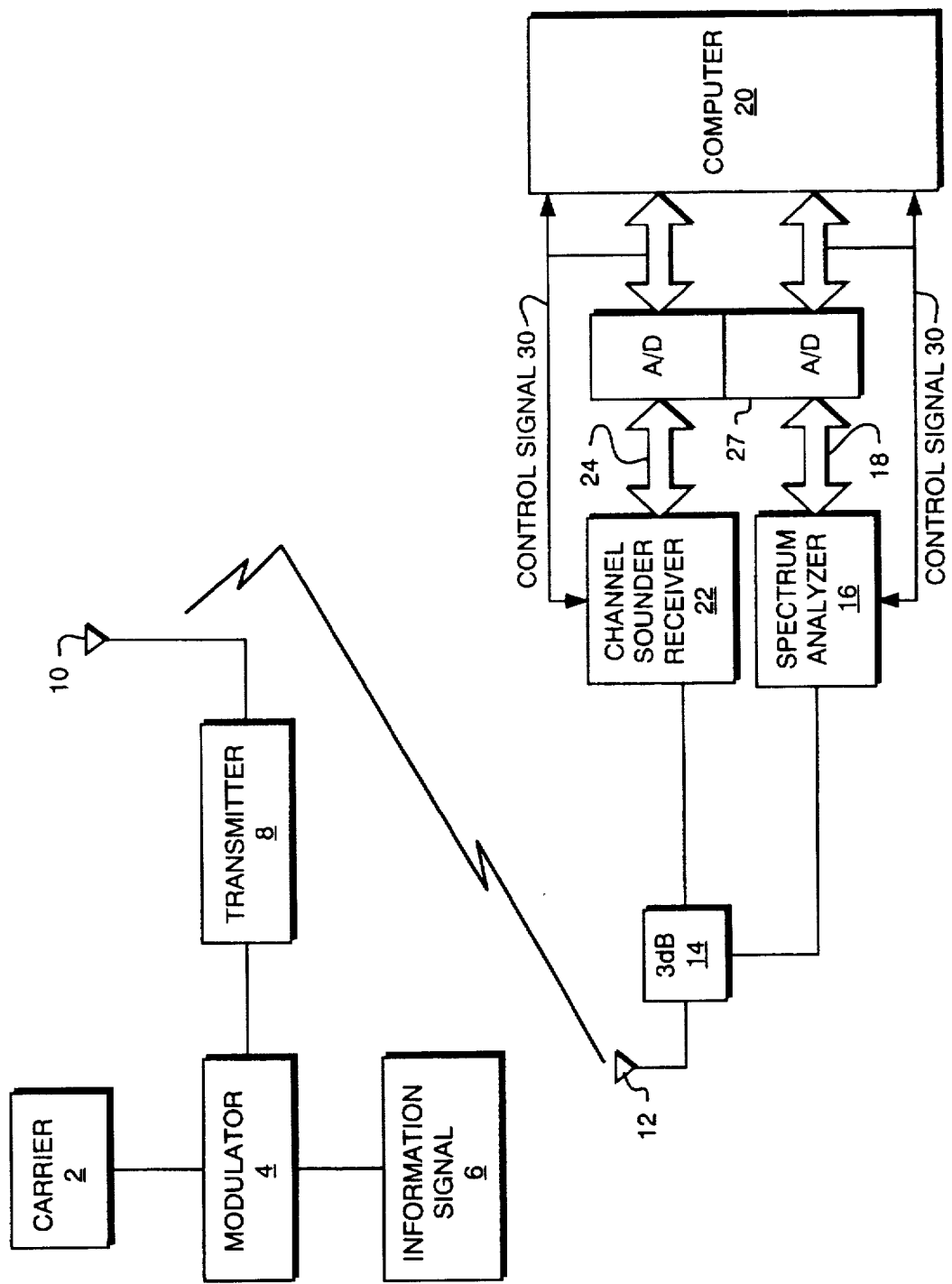
FIG. 1 is a block diagram of a preferred embodiment of the inventive system.
Figure 2:
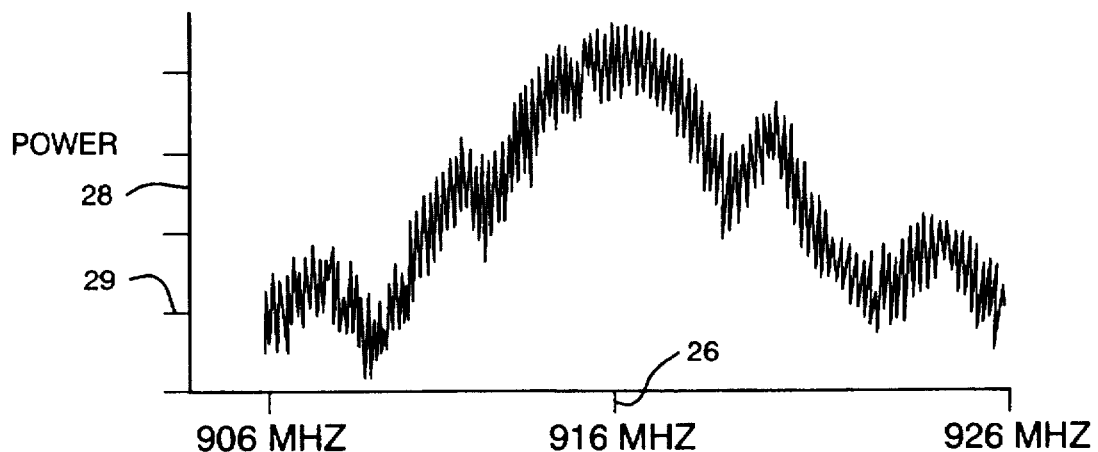
FIG. 2 is a display of a spectrum analyzer for a wide bandwidth signal received.

FIG. 1 represents a specific hardware implementation of the preferred embodiment of the invention, and FIG. 2 shows the spread spectrum signal of a transmitted signal with a center frequency of 916 MHz and a modulating signal of 127 bits long at 3.125 M b/s (bits per second). The specific numbers included in this example are not meant to be limiting as other carrier signals and modulation frequencies and type of modulation signals which are substantially different from this example can also be used in the present invention. A carrier signal 2 at 916 megahertz is combined in a modulator 4 with an information signal 6. The information signal 6 is a sequence of 1's and 0's at 3.125 megabits per second. This modulating signal spreads the center frequency by approximately 3.125 megahertz on both sides of the center frequency, or from about 912.875 to 919.125 megahertz. This signal is then transmitted via the transmitter 8 and the sending or transmitting antenna 10.

Referring to FIG. 1, the signal transmitted by antenna 10 is received by the antenna 12 and is fed to a splitter 14 that attenuates each split signal by, for example, 3 dB. Alternatively, an amplifier (not shown) could be placed in the signal path to compensate for this 3 dB loss. One of the split signals is fed to a wide bandwidth receiver in the form of, for example, Channel Sounder Receiver 22. The second split signal is fed to a narrow bandwidth receiver in the form of, for example, spectrum analyzer 16. The spectrum analyzer 16 is tuned to a center frequency of 916 MHz. It should be noted that during set up and calibration of the inventive system a spectrum analyzer with a wider bandwidth to view the wide bandwidth signal can be used in place of the Channel Sounder Receiver 22. Outputs 18 and 24 from receivers 16 and 22, respectively, are then digitized by analog-to-digital converter 27 and fed into computer 20 for analysis.

FIG. 2 shows the spread or wide bandwidth spectrum signal with a carrier at 916 MHz modulated by a digital 127 word length at 3.125 Mbits/s (megabits per second). Although the preferred embodiment of this invention utilizes as the wide bandwidth receiver a Channel Sounder 22, the display of FIG. 2 is that from a spectrum analyzer which has been tuned to 916 MHz with a wide bandwidth. The Resolution bandwidth (RBW) and the Video bandwidth (VBW) of the spectrum analyzer are set to 300 kHz and the span to 20 MHz to represent the frequency window from 906 to 926 MHz. The x-axis (horizontal) shows the frequency axis with 916 MHz at the center 26. The y-axis shows the associated power level 28 within that frequency band. The vertical scale 29 is in 10 dB steps. In this particular example, a sequence of 1's and 0's at a bit rate of 3.125 Mb/s, modulates the 916 MHz carrier and spreads the received by 3.125 MHz on either side of the 916 MHz center frequency. The refresh rate of the spectrum analyzer is 50 ms.

The following table details the setup for a typical set of narrow bandwidth measurements performed by the spectrum analyzer 16. As before these numbers are examples not meant to be limiting.

| | |
|---|---|
| Transmit Power (Pt) | 43 dBm (20 Watt amplifier) |
| Single Tone Power (Pt/254) | 19 dBm (Ptone) |
| Transmit Antenna Gain | 5 dBi |
| Receive Antenna Gain | 5 dBi |
| Thermal Noise Floor | −174 dBm |
| Receiver Noise Figure | 2 dB |
| Receiver Bandwidth (<1 kHz*) | 30 dB |
| Dynamic Range** | 171 dB |

*below 300 Hertz the output becomes noisy
**Dynamic Range is Ptone less the thermal noise, receiver noise and the Receiver Bandwidth compensation.

Operating as detailed in Table 1 shows that the dynamic range that is obtainable under these conditions is sufficient for measurement distances over 2 Km between the transmitting antenna 10 and the receiving antenna 12. This assumes a mobile height antenna and transmit antenna of 8 meters and a fade margin of 30 dB.

Figure 3:
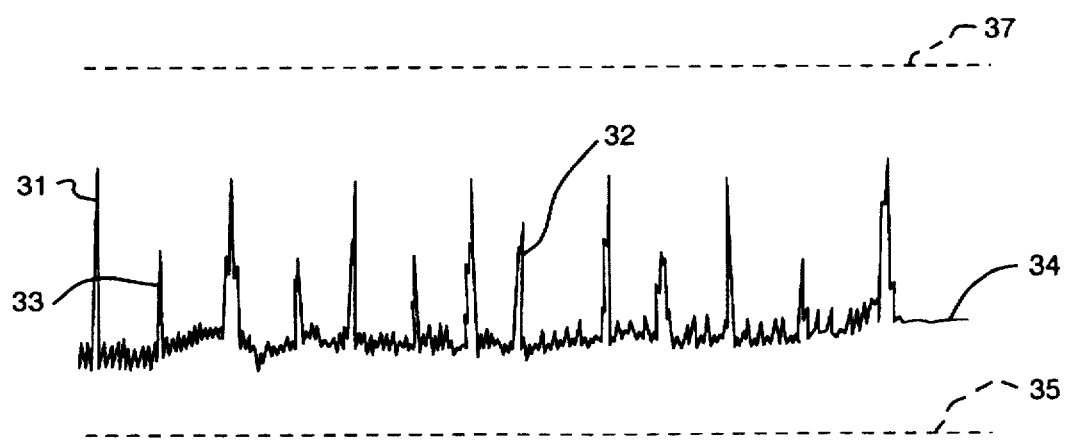
FIG. 3 is a display of a spectrum analyzer for a narrow bandwidth signal received.

FIG. 3 shows the spectrum analyzer display as in FIG. 2 with identical parameters except with the span range is first narrowed to 200 kHz around the center 916 MHz frequency so that the center frequency spike 32 of 916 MHZ is shown. This spike is reduced because the carrier has been reduced in signal level. The spikes 31 are harmonics which are larger, and the other smaller spikes 33 are imperfections caused from the transmitting of the signal. The floor 34 of the display is produced by the background noise within the transmitter and the spectrum analyzer itself. This floor is 20 dB below the signal and does not substantially affect the measurements. The small signal spikes on this floor are from circuitry imperfections. The spectrum analyzer that produces the signal of FIG. 3 is a highly tuned receiver or radio of very narrow band width.

Next, after the spectrum of FIG. 3 is reviewed, the span of the spectrum analyzer is set to zero and the sweep rate is set to 10 ms. In this instance, the spectrum analyzer locks onto a single tone of the transmitting signal and detects, measures and outputs a constant or dc signal level. The dc level is directly related to the power level of the locked signal frequency. Any variation of the dc level represents a signal loss of this particular tone. The specific set up is shown at the bottom of the screen at 35 of FIG. 3 which represents zero voltage output from the spectrum analyzer while the top of the screen 37 is one volt. The spectrum analyzer's output 18 after being digitized is input, sampled and stored for display or other analysis in a computer 20. Typical sampling rates are several times per second to several thousand times per second. An eight bit analog to digital (A/D) converter 27 can be used. However, ten, twelve, sixteen and even greater bit length resolution converters may also be used. The output 24 of Channel Sounder Receiver 22 is also input, sampled and stored for display in computer 20. A control signal 30 interfaces receivers 16 and 22 with A/D converter 27 and computer 20.

Figure 4:
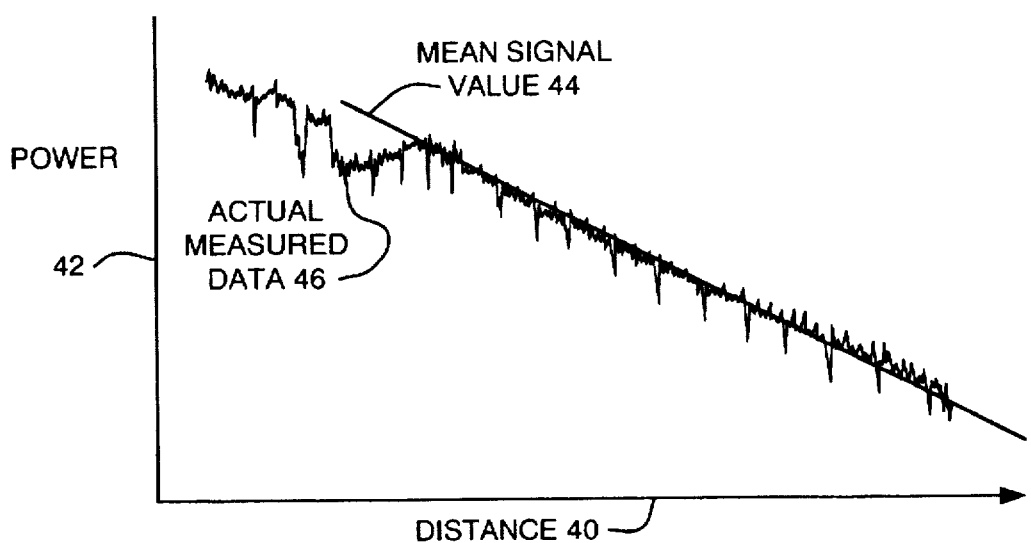
FIG. 4 is the a graph of power versus distance between the transmitter and the receiver.

FIG. 4 shows the decreasing nature of the received signal as the distance 40 between the transmitting antenna 10 and the receiving antenna 12 increases. The vertical scale 42 is the received power. The straight line 44 is the best fitting straight line for the measured data as shown. The ragged line 46 is the actual data. Other curves can be fitted to the actual data and used in other environments.

Figure 5:
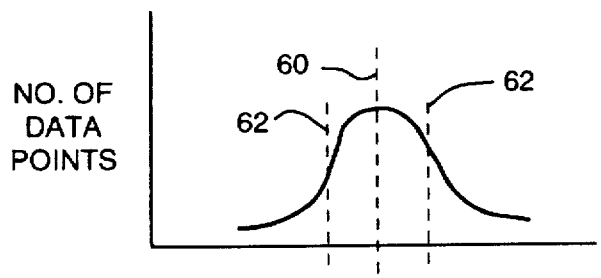
FIG. 5 is a graph of the main and delayed signals.

FIG. 5 shows a typical normal distribution of the actual data signals at any specific distance between the transmitting antenna 10 and the receiving antenna 12. The mean is a location of the straight line of FIG. 4 and the standard deviation 62 on either side of the mean is an indication of the lognormal shadowing associated with the environment.

Figure 6:
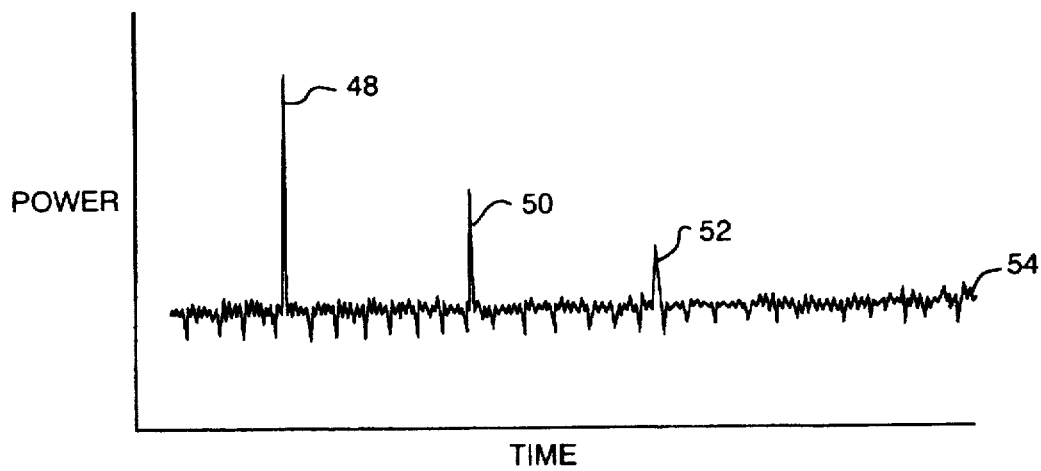
FIG. 6 is the typical normal distribution of deviations from the average signal power at any specific location.

FIG. 6 is a graph of a wide bandwidth measurement showing the reflected signals since there are multiple path ways from the transmitter to the receiver. The main signal 48 and two reflected signals 50 and 52 are shown. The signals 50 and 52 are delayed by an amount dependent upon the physical paths taken. The time delays are not functions of each other.

In practice, a spectrum analyzer 16 is used for narrow bandwidth measurements, and a Channel Sounder Receiver 22 is used for receiving and measuring the wide bandwidth signal. Although the measurements may be sequential, the short time span between the measurements and the statistical nature of the output yields equivalent information to simultaneous measurements. In practice the spectrum analyzer 16 frequency range may be expanded so that the signal being received by the Channel Sounder Receiver 22 may be viewed by personnel setting up and performing the measurements.

The measurements are reported in statistical terms over time and distance in the vicinity of the immediate environment. The parameters of the reported measurements are, for example, for the narrow bandwidth signal, the variation in the signal level in the vicinity of the receiver is recorded and measured. The data is digitized and fed to computer 20 for analysis. The data is organized and presented to show the average signal level, that is the signal power level, variation with distance from the transmitting antenna 10. The deviation of the actual signal level from the average can be generated for any specific location and a distribution indicating standard deviations formulated. From this data processing the lognormal shadowing of any particular location and the environment is generated. This data is important for designing cellular and other wireless transmitting systems. For the wide bandwidth signal the measurements are performed as with the narrow bandwidth signals. The entire bandwidth is received and processed as for the narrow bandwidth. However, other characteristics and parameters are often generated. For example, actual delays between the reflected signal and the multipaths taken by the transmitted signal creates an ms (root mean square calculation of power in an AC signal) delay spread. That is the signal power has a delay parameter. In addition, there may be Doppler shifts that are caused by the receiver moving relative to the transmitter.

Both narrow and wide bandwidth measurements are needed in the present invention since the phenomena which affects a single tone or frequency, usually well under one megahertz, does not necessarily affect the wide bandwidth signal. Narrow bandwidth measurements are usually obtained by transmitting a given tone, or substantially single RF frequency. The tone is received and the signal power measured over time. The effect of phenomena that cause the signal power to fade or otherwise change can be measured and recorded. Wide bandwidth measurements are usually obtained by transmitting a radio frequency carrier modulated to produce a received signal frequency spread over several megahertz around the carrier frequency.

A specific use, made of the wide bandwidth measurements, is to measure the delay from the multiple paths and reflections that the radio frequency signals take in finally reaching antenna 12. This may be accomplished by a "slip correlation" scheme where the transmitted modulating signal is recreated at the receiver with a slight time offset. Other techniques are known in the art for accomplishing this measurement of the delay. The recreated signal is then time shifted or slipped with respect to the received signal and the correlation spikes are indicators of the delay in the various paths that the received signal has taken in reaching the receiving antenna. The technique essentially performs a convolution integration of the sent signal and the adulterated received signal. This technique cannot practically be accomplished transmitting a single tone since reflections and other interfering items will not respond uniformly over the frequency range.

Such radio signal transmission characteristics are measured at a given location, and repeated within a few meters of that location. Therefore it becomes possible to determine whether the location exhibits a rapidly changing reception area which may be unsuitable for a receiving station or the like.

The simultaneous measurements obtained with the system of the present invention are advantageous since there is duplication of labor in setting up equipment and making separate measurements for a wide bandwidth signal and then for a narrow bandwidth signal. Also, since there are separate licenses needed for wide bandwidth and narrow bandwidth broadcasting, a simultaneous measurement (while only transmitting a wide bandwidth RF signal) would obviously require only the wide bandwidth license.

In a preferred embodiment of this invention the band width setting of the spectrum analyzer 16 is theoretically zero hertz, but, in practice, the bandwidth setting under one megahertz down to about 300 hertz is used. This range of 1 KHz to 300 hertz is used to account for Doppler effects, transmitter frequency drifts, and noise which becomes great at narrower frequency ranges. The span of the spectrum analyzer 16 is set to zero or near zero and the spectrum analyzer output is a dc signal that represents the signal power for that tone.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for simultaneously measuring the transmission characteristics of wide bandwidth and the narrow bandwidth radio signals of a communication channel at a location comprising:

an RF antenna constructed and arranged for receiving RF signals, first means for selectively receiving and processing said wide bandwidth radio signals from said RF signals and producing therefrom a first output, where said first output is related to said wide bandwidth radio signal transmission characteristics;

second means for selectively receiving and processing said narrow bandwidth radio signals from said RF signals and producing therefrom a second output, where said second output is related to said narrow bandwidth radio signal transmission characteristics;

means for transporting the RF signals from said antenna to said first and to said second receiving means; and said wide and narrow bandwidth radio signals being received by said receiving means at substantially the same time and same location and said wide bandwidth and narrow bandwidth radio signal transmission characteristics thereof being determined therefrom.

2. Apparatus as defined in claim 1 where the means for receiving and processing the narrow bandwidth radio signals includes a spectrum analyzer, said radio signals having a carrier frequency, and said spectrum analyzer arranged for detecting the radio signals at the carrier frequency;

said spectrum analyzer arranged with a bandwidth of less than one kilohertz, and with a sweep rate such that the output from said spectrum analyzer is a dc signal.

3. Apparatus as defined in claim 1 where said wide bandwidth includes a frequency range of one megahertz and greater, and where said narrow bandwidth includes a frequency range of less than one megahertz.

4. Apparatus as defined in claim 1 further comprising:

means for receiving said first and said second outputs and analyzing said first and second outputs to determine the wide bandwidth radio signal transmission characteristics and narrow bandwidth radio signal transmission characteristics, respectively.

5. Apparatus as defined in claim 4 wherein said means for analyzing comprises:

means for digitizing said first output and for digitizing said second output, computing means for determining said wide bandwidth and narrow bandwidth transmission characteristics and for generating a statistical representation of said wide bandwidth and narrow bandwidth transmission characteristics; and means for inputting said digitized first and said digitized second outputs into said computing means.

6. Apparatus as defined in claim 5 where said wide bandwidth includes a frequency range of one megahertz and greater, and where said narrow bandwidth includes a frequency range of less than one megahertz.

7. Apparatus as defined in claim 6 where the means for receiving and processing the narrow bandwidth radio signals includes a spectrum analyzer, said radio signals having a carrier frequency, and said spectrum analyzer arranged for detecting the radio signals at the carrier frequency;

said spectrum analyzer arranged with a bandwidth of less than one kilohertz, and with a sweep rate such that the output from said spectrum analyzer is a dc signal.

8. Apparatus as defined in claim 7 where said transporting means is a signal splitter for substantially simultaneously inputting said RF signals to said first and second receivers.

9. A method for simultaneously measuring the transmission characteristics of wide bandwidth and narrow bandwidth radio signals of a communication channel transmitted by RF signals to a location for subsequent analysis, said method comprising the steps of:

transmitting said RF signals from a first location;

providing an RF antenna at a second location for receiving said transmitted RF signals;

splitting said RF signals into a first signal and a second signal;

substantially simultaneously receiving said first and second signals by a first receiver and a second receiver, respectively;

processing the wide bandwidth signal of said first signal by said first receiver;

processing the narrow bandwidth signal of said second signal by said second receiver; and determining the wide bandwidth and narrow bandwidth radio signal transmission characteristics at substantially the same time and at substantially the same location.

10. A method as defined in claim 9 further comprising the steps of:

moving said RF receiving antenna to a second location;

determining the wide bandwidth and narrow bandwidth radio signal transmission characteristics at substantially the same time and at said second location for analysis; and analyzing said wide bandwidth and narrow bandwidth radio signal transmission characteristics.

11. A method as defined in claim 10 further comprising the steps of:

moving said RF receiving antenna to a plurality of different locations;

determining the wide bandwidth and narrow bandwidth radio signal transmission characteristics at substantially the same time at said different locations for analysis; and comparing the analyzed characteristics for subsequent use.

12. A method as defined in claim 11 further comprising the steps of:

setting the wide bandwidth frequency range to one megahertz and greater;

setting the narrow bandwidth frequency range to less than one megahertz.

* * * * *